(12) United States Patent
Ravishankar et al.

(10) Patent No.: US 11,807,148 B2
(45) Date of Patent: Nov. 7, 2023

(54) MULTI-DIRECTIONAL CARGO LOADING/UNLOADING SYSTEM (71) Applicant: GM GLOBAL TECHNOLOGY OPERATIONS LLC, Detroit, MI (US)

(72) Inventors: Adhithya Ravishankar, Troy, MI (US); Spencer C. Price, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/565,582

(22) Filed: Dec. 30, 2021

(65) Prior Publication Data
US 2023/0211717 A1 Jul. 6, 2023

(51) Int. Cl.
*B60P 1/44* (2006.01)
*B66F 9/14* (2006.01)
*B60P 1/43* (2006.01)

(52) U.S. Cl.
CPC ........... *B60P 1/4421* (2013.01); *B60P 1/4428* (2013.01); *B60P 1/4442* (2013.01); *B66F 9/148* (2013.01); *B66F 9/149* (2013.01); *B60P 1/43* (2013.01); *B60P 1/4457* (2013.01); *B60P 1/4471* (2013.01); *B60P 1/4492* (2013.01)

(58) Field of Classification Search
CPC ..... B60P 1/4421; B60P 1/4428; B60P 1/4442; B60P 1/4457; B60P 1/4492; B66F 9/148; B66F 9/149
USPC ........................................ 414/541, 544, 666
See application file for complete search history.

(56) References Cited

U.S. PATENT DOCUMENTS

| | | | | |
|---|---|---|---|---|
| 2,498,161 A * | 2/1950 | Hamilton | ................. | B66F 9/02 414/545 |
| 3,504,810 A * | 4/1970 | Walda | ................. | B60P 1/4428 414/541 |
| 3,841,503 A * | 10/1974 | Hollenbach | ............... | B66F 9/07 414/541 |
| 4,274,789 A * | 6/1981 | Martin | ................. | B60P 1/4421 414/501 |
| 6,435,804 B1 * | 8/2002 | Hutchins | ............... | B60P 1/4414 414/541 |
| 6,726,435 B1 * | 4/2004 | Williams | ............. | B60P 1/4442 414/560 |

FOREIGN PATENT DOCUMENTS

CN      112977230 A  *  6/2021  ............ B60P 1/4428
WO  WO-2021182977 A1  *  9/2021  ............ B60P 1/4421

* cited by examiner

*Primary Examiner* — James Keenan
(74) *Attorney, Agent, or Firm* — CANTOR COLBURN LLP (57) ABSTRACT

A vehicle, cargo transfer device of the vehicle and a method of transferring a package between a vehicle to a delivery platform. A lift platform is extended from a floor of the vehicle via a support structure. The package is moved to the lift platform from one of the floor and the delivery platform. The lift platform is rotated via a turntable through a rotation angle. The support structure supports the turntable and the lift platform. The package is moved from the lift platform to the other of the floor and the delivery platform.

17 Claims, 12 Drawing Sheets

MULTI-DIRECTIONAL CARGO LOADING/UNLOADING SYSTEM

The subject disclosure relates to loading and unloading packages from a delivery vehicle or truck and, in particular, to a system and method for loading and unloading cargo to and from delivery platforms at non-standard locations with respect to the delivery vehicle.

Delivery trucks or vans are used to transport and deliver cargo. When delivering a heavy package, a ramp at the rear of the truck is often used to raise and lower the package between the floor of the truck and the ground. However, in some situations, the delivery platforms for receiving the package are at locations other than directly behind the delivery vehicle. Accordingly, it is desirable to provide a system that can deliver a package from the rear of the delivery vehicle to a location at a side of the delivery vehicle.

SUMMARY

In one exemplary embodiment, a method of transferring a package between a vehicle to a delivery platform is disclosed. A lift platform is extended from a floor of the vehicle via a support structure. The package is moved to the lift platform from one of the floor and the delivery platform. The lift platform is rotated through a rotation angle. The package is moved from the lift platform to the other of the floor and the delivery platform.

In addition to one or more of the features described herein, the method further includes moving the lift platform along a transverse axis of the vehicle via a slider rail mechanism coupled to the support structure. The method further includes moving the support structure vertically with respect to the floor of the vehicle. The method further includes moving the support structure parallel to the floor via a linear actuator to extend the lift platform from the floor. The lift platform includes a center section, a front bridge plate hingedly coupled to the center section and a rear bridge plate hingedly coupled to the center section, and at least one of the front bridge plate and the rear bridge plate can be rotated to a 90-degree position with respect to the center section. The method further includes rotating the front bridge plate to a 180-degree position with respect to the center section to form a bridge between the floor and the center section. The delivery platform can be at one of a left side and a right side of the vehicle.

In another exemplary embodiment, a cargo transfer device for a vehicle is disclosed. The cargo transfer device includes a lift platform configured to extend from the vehicle for supporting a package, a turntable configured to rotate the lift platform through a rotation angle, and a support structure configured to support the turntable and the lift platform at a location away from the vehicle.

In addition to one or more of the features described herein, the cargo transfer device further includes a slider rail mechanism for moving the lift platform along a transverse axis of the vehicle. The cargo transfer device further includes a rail lift for moving the support structure vertically with respect to a floor of the vehicle. The cargo transfer device further includes a linear actuator for moving the support structure parallel to a floor of the vehicle to extend the lift platform from the floor. The lift platform includes a center section, a front bridge plate hingedly coupled to the center section and a rear bridge plate hingedly coupled to the center section, wherein at least one of the front bridge plate and the rear bridge plate are configured to be rotated to a 90-degree position with respect to the center section. The front bridge plate is configured to rotate to a 180-degree position to form a bridge between a floor of the vehicle and the center section. The turntable rotates the lift platform for unloading of the package to the delivery location at one of a left side and a right side of the vehicle.

In another exemplary embodiment, a vehicle is disclosed. The vehicle includes a cargo area and a cargo transfer device located within the cargo area. The cargo transfer device includes a lift platform configured to extend from the vehicle for supporting a package, a turntable configured to rotate the lift platform through a rotation angle, and a support structure configured to support the turntable and the lift platform at a location away from the vehicle.

In addition to one or more of the features described herein, the vehicle further includes a slider rail mechanism for moving the lift platform along a transverse axis of the vehicle of the vehicle. The vehicle further includes a rail lift for moving the support structure vertically with respect to a floor of the vehicle and a linear actuator for moving the support structure parallel to the to extend the lift platform from the floor. The lift platform includes a center section, a front bridge plate hingedly coupled to the center section and a rear bridge plate hingedly coupled to the center section, wherein at least one of the front bridge plate and the rear bridge plate are configured to rotated to a 90-degree position with respect to the center section. The front bridge plate is configured to rotate to a 180-degree position to form a bridge between a floor of the cargo area and the center section. The turntable rotates the lift platform for unloading of the package to a delivery platform at one of a left side and a right side of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
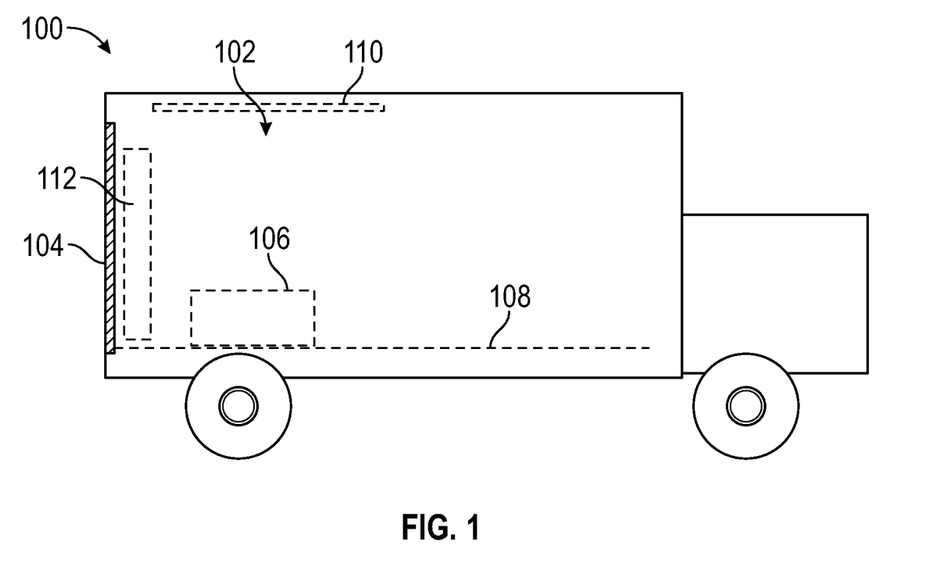
FIG. 1 shows a delivery vehicle, in accordance with an exemplary embodiment.

In accordance with an exemplary embodiment, FIG. 1 shows a delivery vehicle 100. The delivery vehicle 100 includes a cargo area 102 and a door 104 at the back of the delivery vehicle. One or more packages, as illustrated by package 106, can sit on a floor 108 of the cargo area 102 as it is transported to a delivery location. The door 104 is shown in a closed position. The door 104 can be raised to an open position 110 to open the cargo area 102 at the back end of the delivery vehicle 100, thereby allowing the package 106 to be removed via the back end. The package 106 can have a set of rollers at its bottom or can be set on a dolly having rollers, to allow the package to be rolled out of the delivery vehicle 100. A cargo transfer device 112 is located in the cargo area and resides next to the door 104 when the door is in the closed position. The cargo transfer device 112 is shown in a retracted position.

Figure 2:
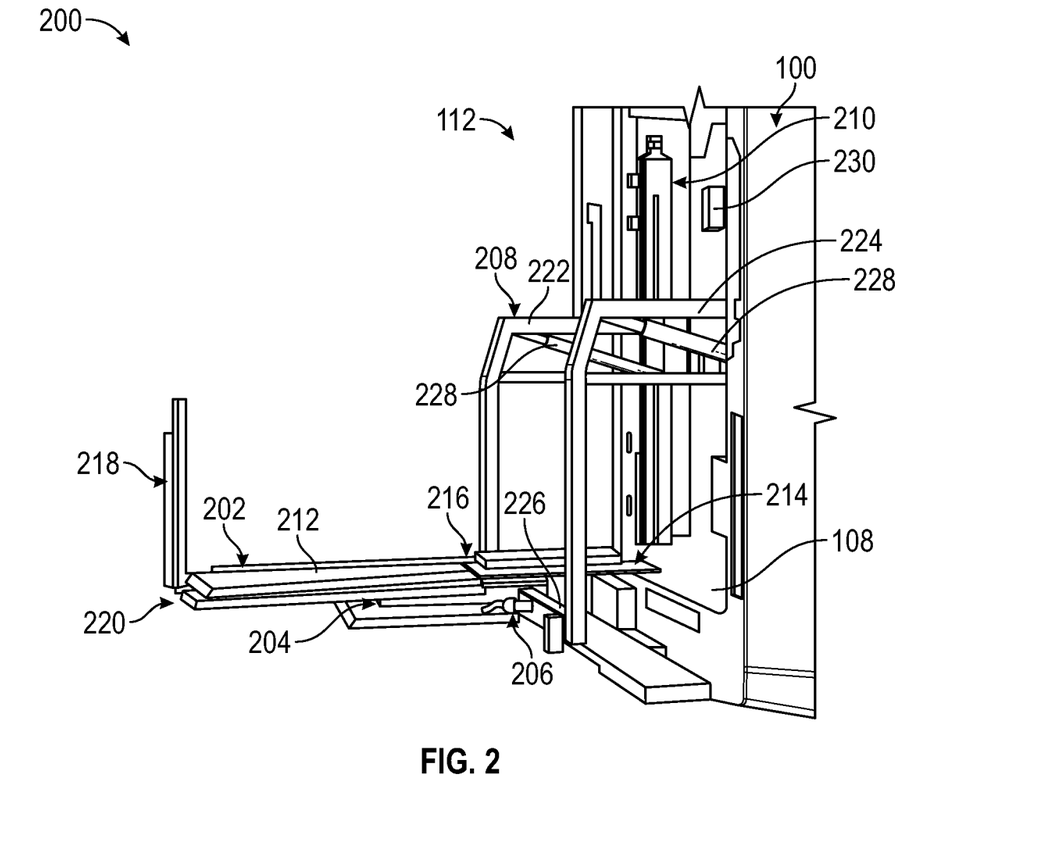
FIG. 2 shows a rear section of the delivery vehicle.

FIG. 2 shows a rear section 200 of the delivery vehicle 100. The rear section 200 is shown with the door 104 in the open position 110 and the cargo transfer device 112 in an extended position from the back of the delivery vehicle 100. The cargo transfer device 112 includes a lift platform 202, a turntable 204, a slider rail mechanism 206, a support structure 208, and a rail lift 210. A control box 230 is shown inside the cargo area 102 for controlling operation of the cargo transfer device 112, such as operation of the rail lift 210, etc. The control box 230 can be fixed at a location in the cargo area 102 or can be a portable handset that allows an operator to operate the cargo transfer device 112 while the operator is outside of the delivery vehicle 100.

The lift platform 202 includes a center section 212, a front bridge plate 214 hingedly attached to the center section 212 at a first end 216 of the center section, and a rear bridge plate 218 hingedly attached to the center section 212 at a second end 220 of the center section. To transfer a package, the lift platform 202 is placed in an extended configuration in which the center section 212 is supported outside of the truck away from the floor 108, with the first end 216 proximate the floor 108 and the second end 220 distal from the floor.

The front bridge plate 214 can be rotated through at least a 180-degree range with respect to the center section 212. In a 0-degree position, the front bridge plate is folded onto the center section 212 so that it rests on top of the center plate. In a 90-degree position, the front bridge plate 214 is perpendicular to the plane of the center section 212. In a 180-degree position, the front bridge plate 214 is in an extended position away from the center section 212, thereby extending the length of the lift platform to the length of the center section 212 plus the length of the front bridge plate 214. The front bridge plate 214 can be locked at any angular position, including the 0-degree position, the 90-degree position and the 180-degree position. During loading to and unloading from the floor 108, the front bridge plate 214 is placed in the 180-degree position and extends from the floor 108 at the back end of the delivery vehicle 100 to the lift platform 202, thereby creating a bridge by which a package can be transported between the floor and the lift platform.

The rear bridge plate 218 can be rotated through at least a 180-degree angle with respect to the center section 212. In a 0-degree position, the rear bridge plate 218 is folded onto the center section 212 so that it rests on top of the center plate. In a 90-degree position, the rear bridge plate 218 is perpendicular to the plane of the center section 212. In a 180-degree position, the rear bridge plate 218 is in an extended position away from the center section 212, thereby extending the length of the lift platform 202 to the length of the center section 212 plus the length of the rear bridge plate 218. The rear bridge plate 218 can be locked at any angular position, including the 0-degree position, the 90-degree position and the 180-degree position.

The front bridge plate 214 and the rear bridge plate 218 can be locked into their respective 90-degree positions when a package is on the center section 212 to prevent the package 106 from rolling off of the lift platform 202. The front bridge plate 214 and the rear bridge plate 218 can be folded up into their respective 0-degree positions so that the lift platform 202 can be retracted into the delivery vehicle 100. In the retracted position, the first end 216 is located near the floor 108 and the second end 220 is located away from the floor.

The lift platform 202 is coupled to the turntable 204 and rests on the turntable 204 when in the extended configuration. The turntable 204 has a stationary section and a rotatable section that is rotatable with respect to the stationary section. The turntable 204 can be operated manually or using a command signal entered at the control box 230. The center section 212 of the lift platform 202 is coupled to the rotatable section of the turntable 204. The stationary section is coupled to the slider rail mechanism 206. The turntable 204 allows the lift platform to be rotated through a plurality of angles. In an embodiment, the lift platform can be rotated through a full 360 degrees. The rotatable section of the turntable can be locked at any selected angular position with respect to the stationary section.

The support structure 208 includes a left support beam 222, a right support beam 224 and a transverse horizontal beam 226 that extends between the left support beam and the right support beam. The left support beam 222 is slidably coupled to a left section of a rail lift 210. The right support beam 224 is slidably coupled to a right section of the rail lift 210. The rail lift 210 can be operated to move the support structure 208 vertically, thereby raising and lowering the lift platform 202 as appropriate. The support structure 208 can also be moved horizontally (i.e., parallel to the floor 108) via one or more linear actuators 228.

The slider rail mechanism 206 is slidably coupled to the transverse horizontal beam 226 of the support structure 208 and can move along the transverse horizontal beam along a transverse axis of the delivery vehicle 100. The slider rail mechanism 206 can be controlled via an electrical signal to move to any location along the transverse horizontal beam 226.

Thus, with the lift platform 202 in the extended configuration, the vertical position of the lift platform can be adjusted by activating the rail lift 210, the horizontal location of the lift platform can be adjusted by activating the slider rail mechanism 206, and the orientation of the lift platform can be adjusted by activating the turntable 204. The rail lift 210, slider rail mechanism 206 and turntable can be controlled by signals entered into the control box 230 by the operator.

Figure 3A:
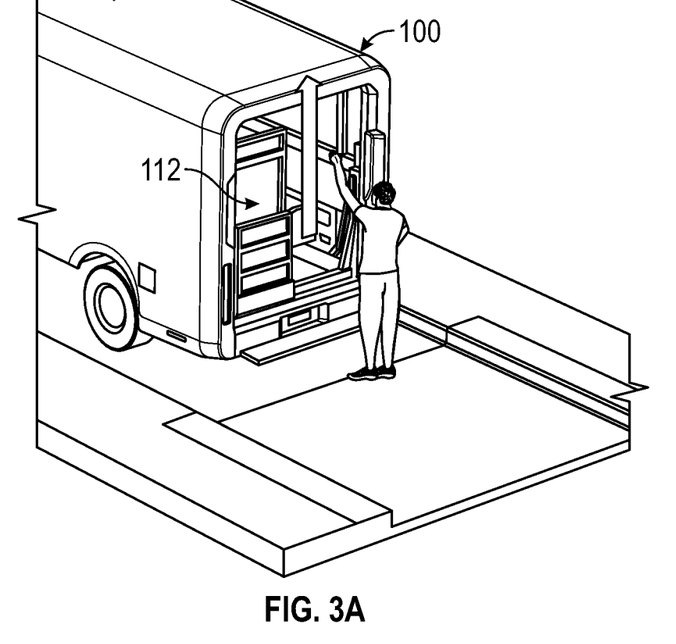
FIGS. 3A-3J illustrate commencing steps of a cargo unloading operation that can be performed using the cargo transfer device.
Figure 3B:
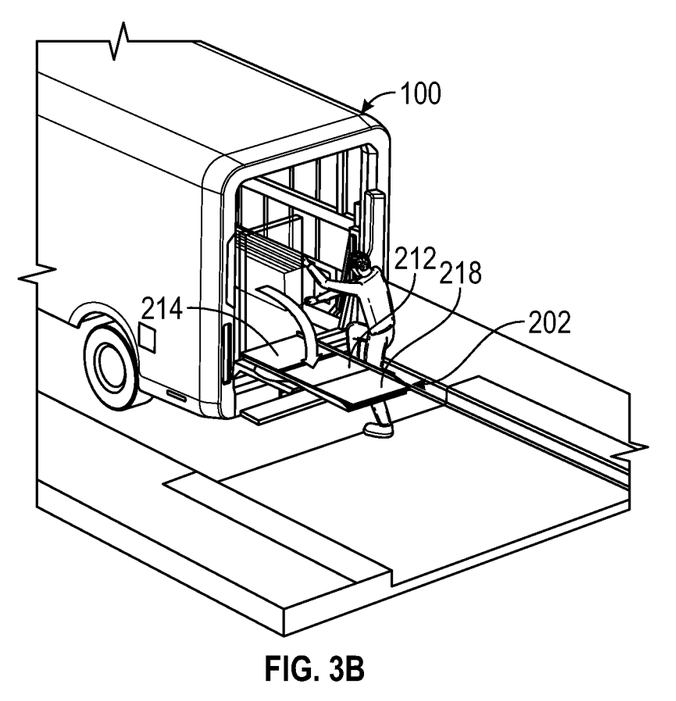
Figure 3C:
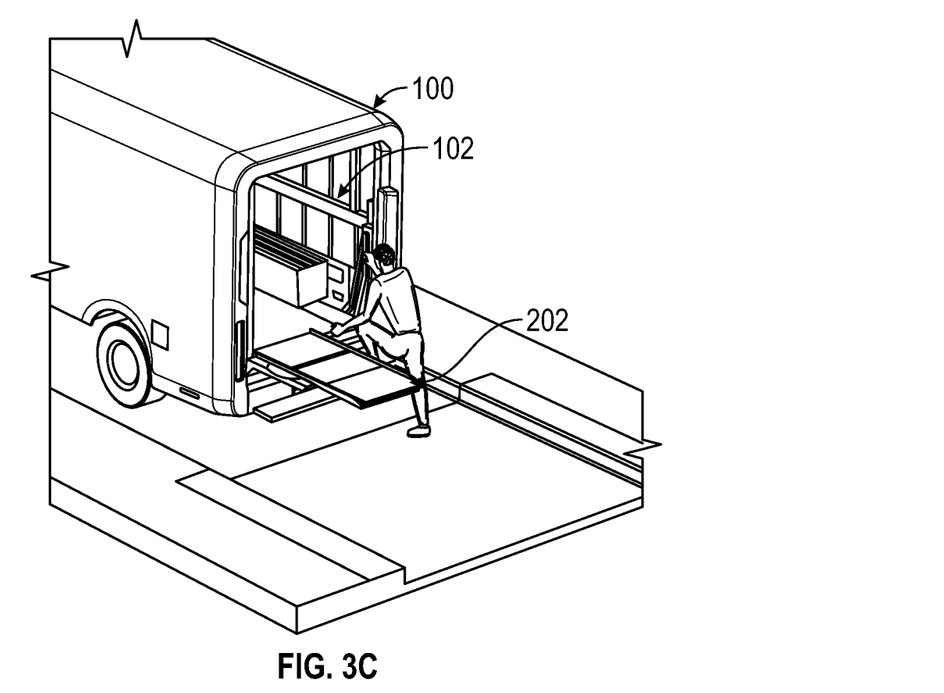
Figure 3D:
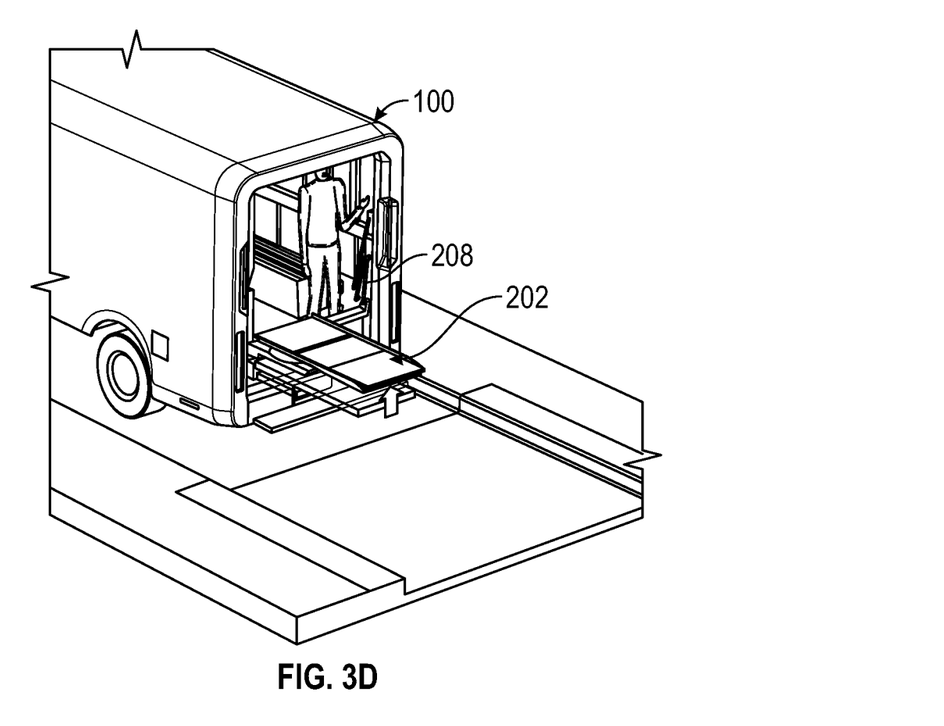
Figure 3E:
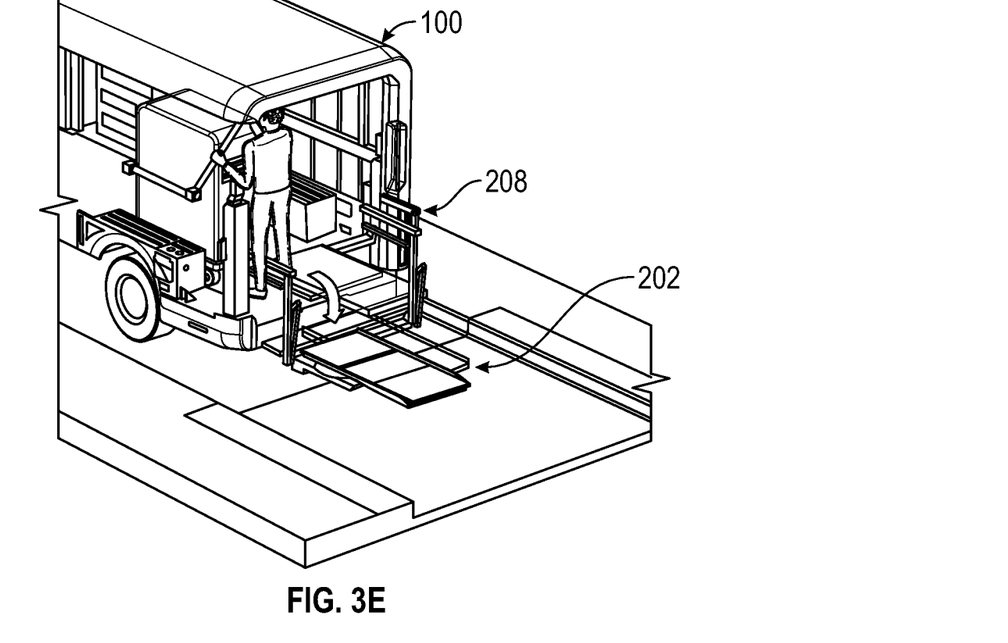

FIGS. 3A-3J illustrate commencing steps of a cargo unloading operation that can be performed using the cargo transfer device 112. As shown in FIG. 3A, the operation begins by the operator opening the door to the cargo area. As shown in FIG. 3B, the operator then folds down the lift platform 202 into a horizontal position. The front bridge plate 214 and the rear bridge plate 218 are the folded-up position (0-degree position). As shown in FIG. 3C, the operator then enters the cargo area 102. As shown in FIGS. 3D and 3E, the operator initiates a deployment of the lift platform 202 by moving the support structure 208 using commands at the control box. The deployment of the lift platform 202 includes extending the lift platform away from the cargo area 102 and adjusting a vertical height of the lift platform. The lift platform 202 is extended from the cargo area 102 by moving the support structure 208 at least one of horizontally and vertically.

Figure 3F:
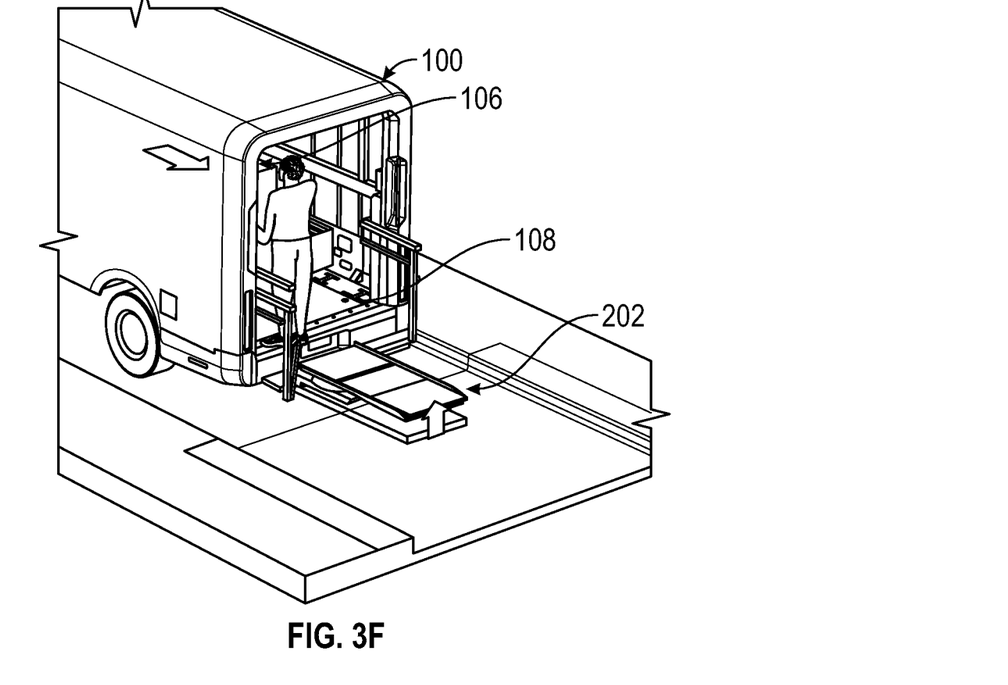
Figure 3G:
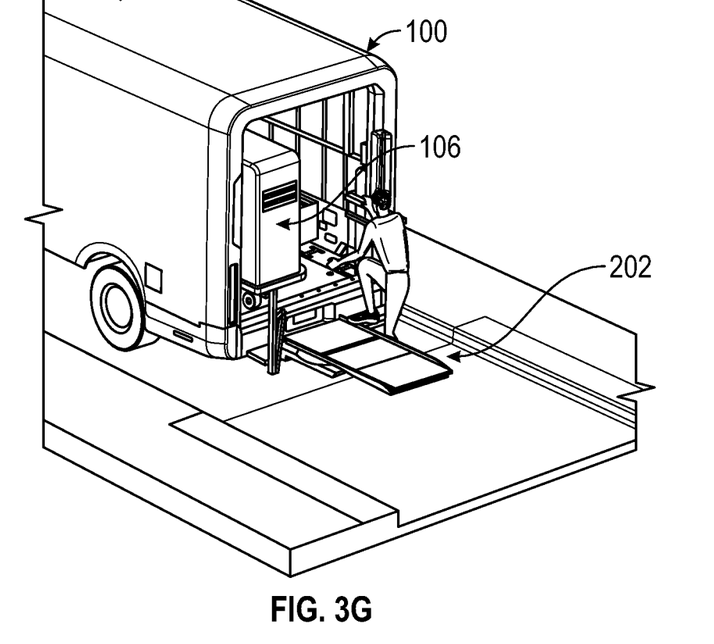
Figure 3H:
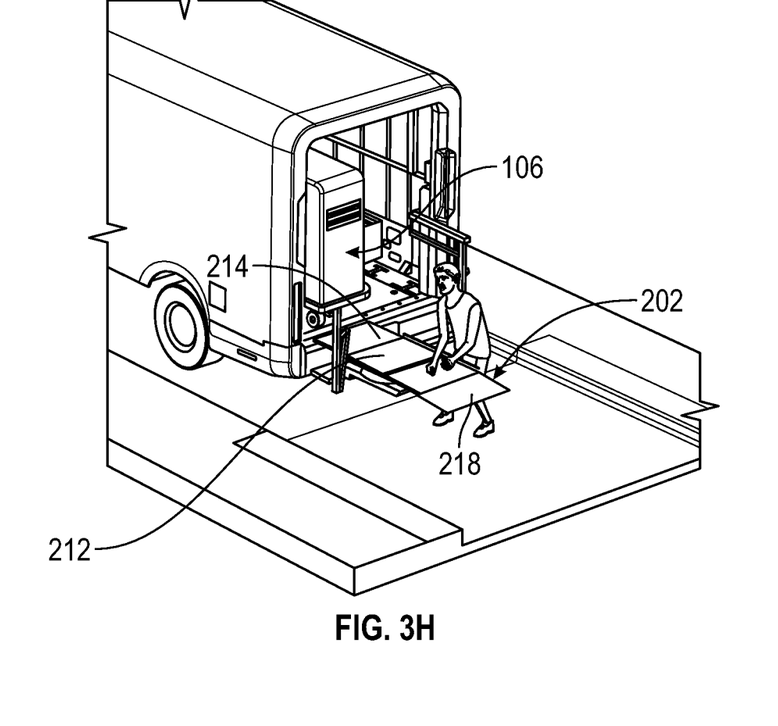
Figure 3I:
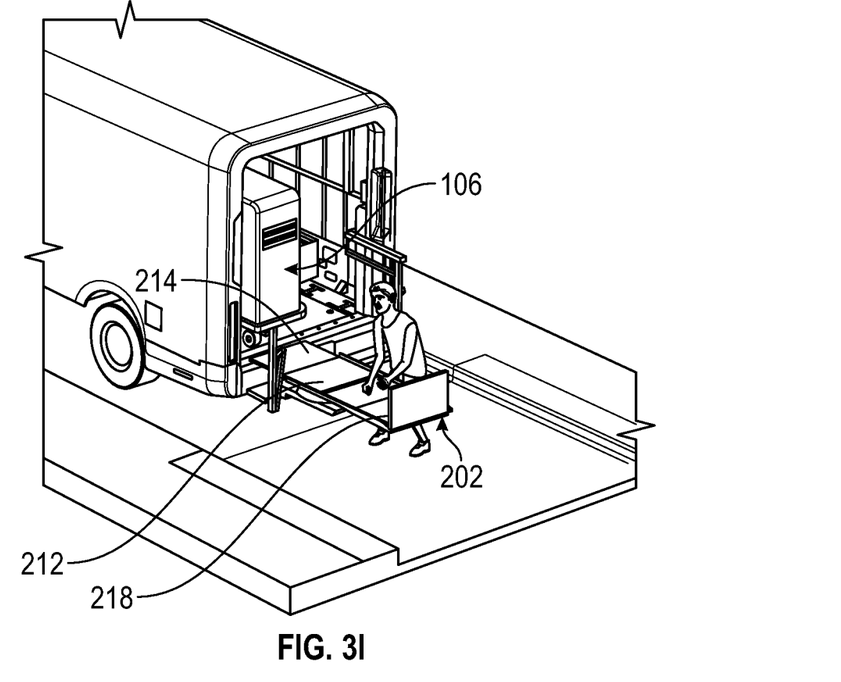
Figure 3J:
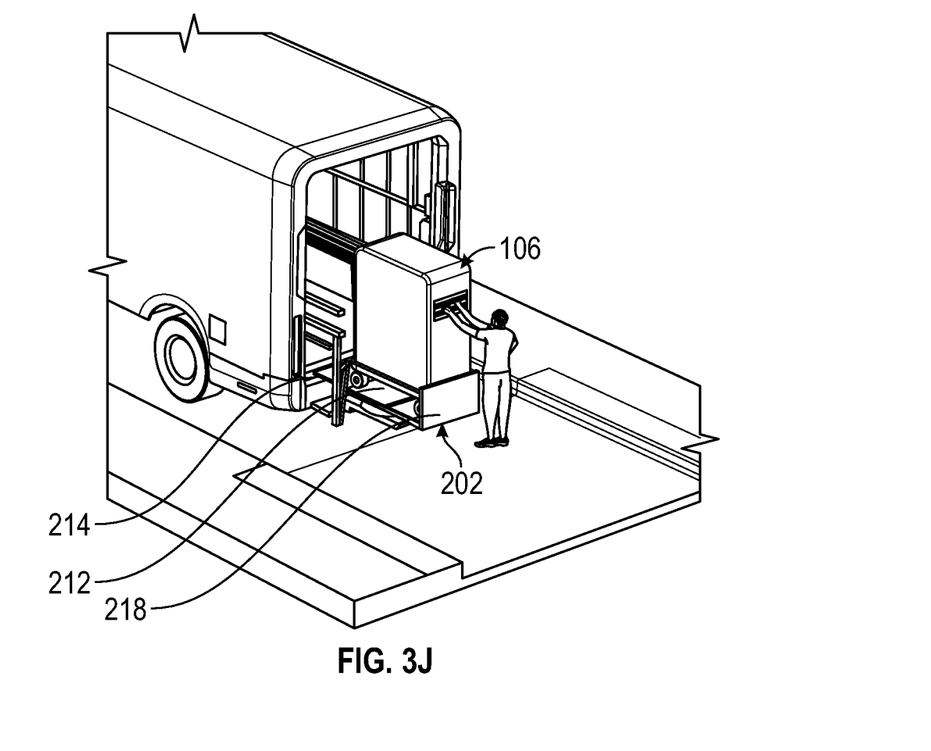

As shown in FIG. 3F, the package 106 is pulled up to the back edge of the floor 108. As shown in FIG. 3G, the operator gets out of the delivery vehicle 100 and stands on the road next to the lift platform 202. As shown in FIG. 3H, the operator unlocks the front bridge plate 214 and rotates it into the 180-degree position. As shown in FIG. 3I, the operator then unlocks the rear bridge plate 218 and rotates it into the 90-degree position. As shown in FIG. 3J, the operator then rolls the package 106 onto the lift platform 202 via the front bridge plate 214. The rear bridge plate 218 provides a rear stop or rear guardrail for the package 106. The front bridge plate 214 can be rotated into the 90-degree position once the package 106 is on the center section 212 to provide a front stop or front guardrail for the package.

Figure 4A:
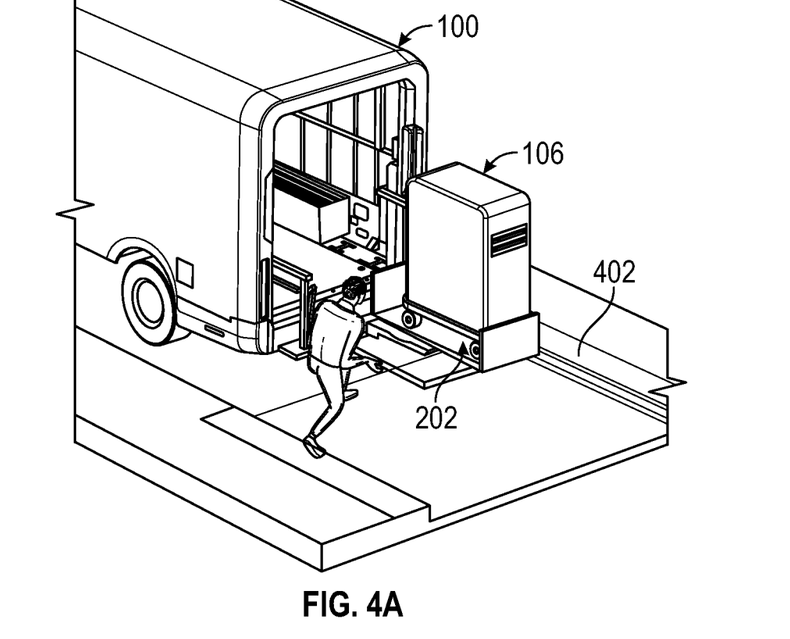
FIGS. 4A-4E illustrate concluding steps of the cargo unloading operation for unloading the package to a delivery platform to a side of the delivery vehicle.
Figure 4B:
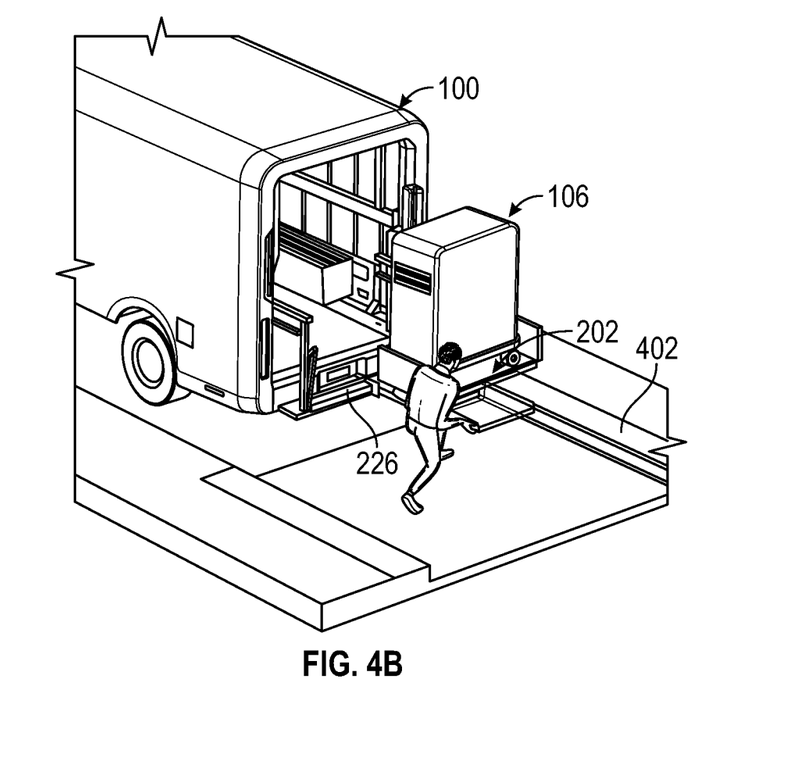

FIGS. 4A-4E illustrate concluding steps of the cargo unloading operation for unloading the package 106 to a delivery platform 402 to a side of the delivery vehicle 100. The concluding steps of FIGS. 4A-4E are performed after the steps of FIGS. 3A-3J or when the lift is in the configuration shown in FIG. 3J. As shown in FIG. 4A, the lift platform 202 is moved along a transverse axis of the delivery vehicle 100 to one side of the delivery vehicle using the slider rail mechanism 206. As shown in FIG. 4B, the lift platform 202 is rotated via the turntable 204 to place the back end of the lift platform at the delivery platform 402, which can be sidewalk or curb. In one embodiment, the turntable can be rotated 90 degrees. However, any suitable rotation angle can be achieved in order to align the lift platform 202 with a delivery platform 402 that is at different locations with respect to the delivery vehicle 100.

Figure 4C:
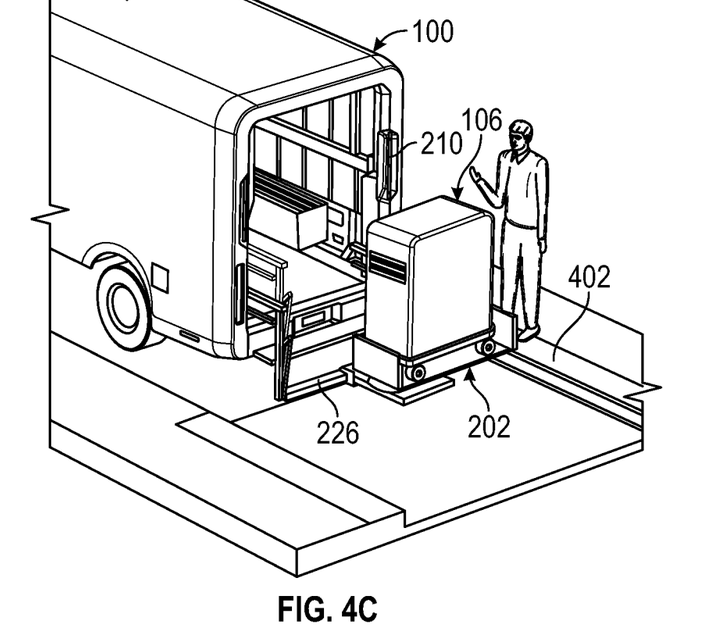
Figure 4D:
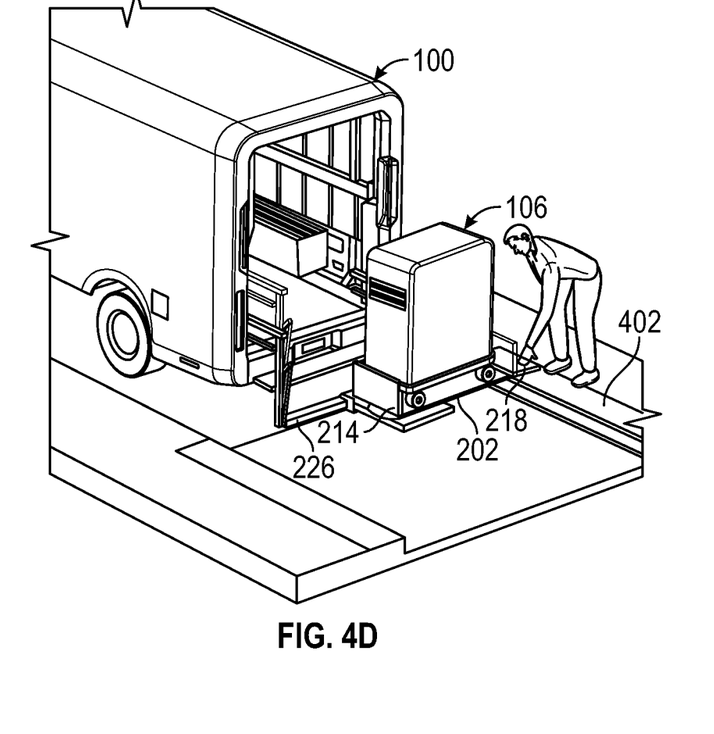
Figure 4E:
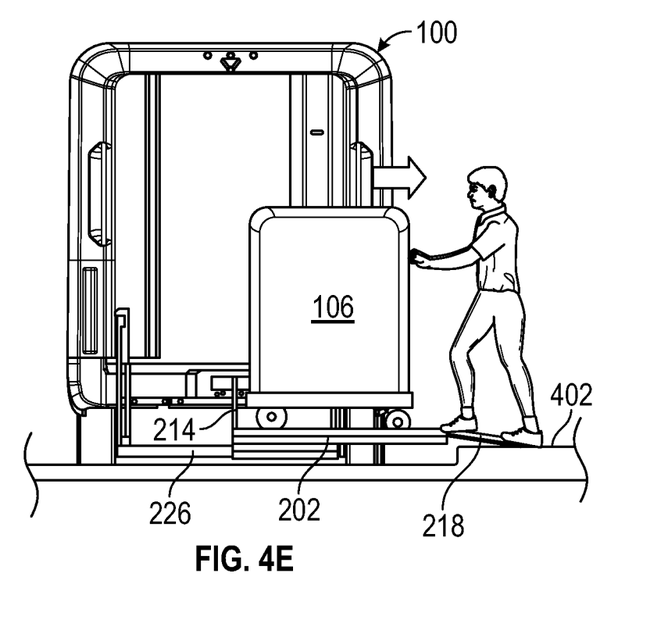

As shown in FIG. 4C, the lift platform 202 is lowered to the curb using the rail lift 210. As shown in FIG. 4D, the rear bridge plate 218 is unlocked from the 90-degree position and rotated into the 180-degree position. In the 180-degree position, an outer edge of the rear bridge plate 218 rests on the delivery platform 402 (e.g., sidewalk or curb). As shown in FIG. 4E, the package 106 is then rolled off of the lift platform 202 onto the delivery platform 402 via the rear bridge plate 218.

Figure 5A:
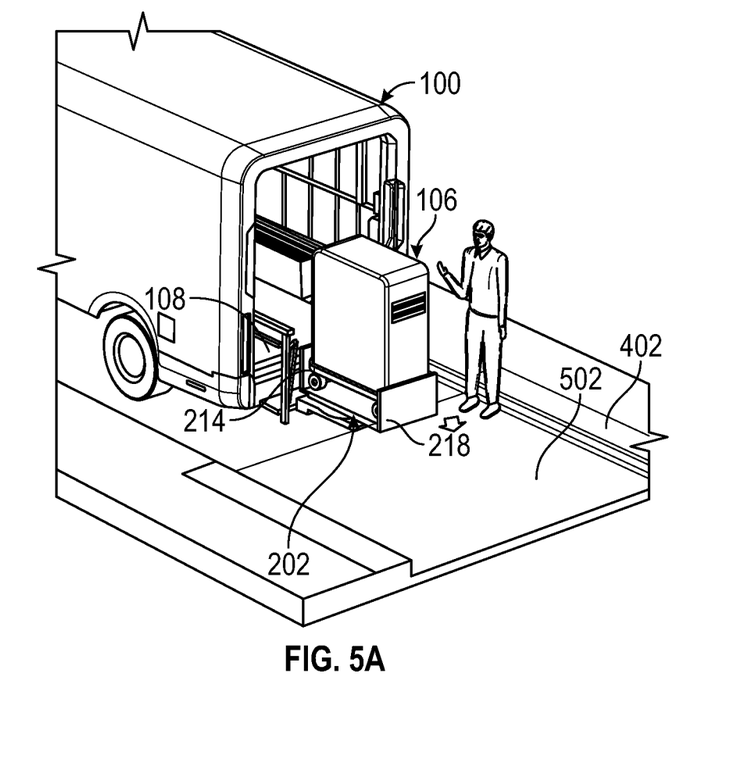
FIGS. 5A-5C illustrate concluding steps of the cargo unloading operation for unloading the package to a street or a delivery platform below the floor 108 of the delivery vehicle 100.
Figure 5B:
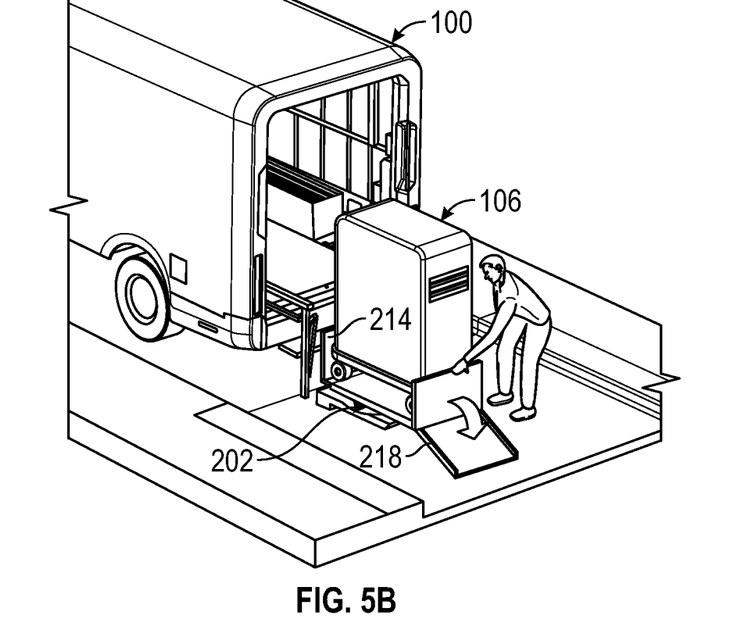
Figure 5C:
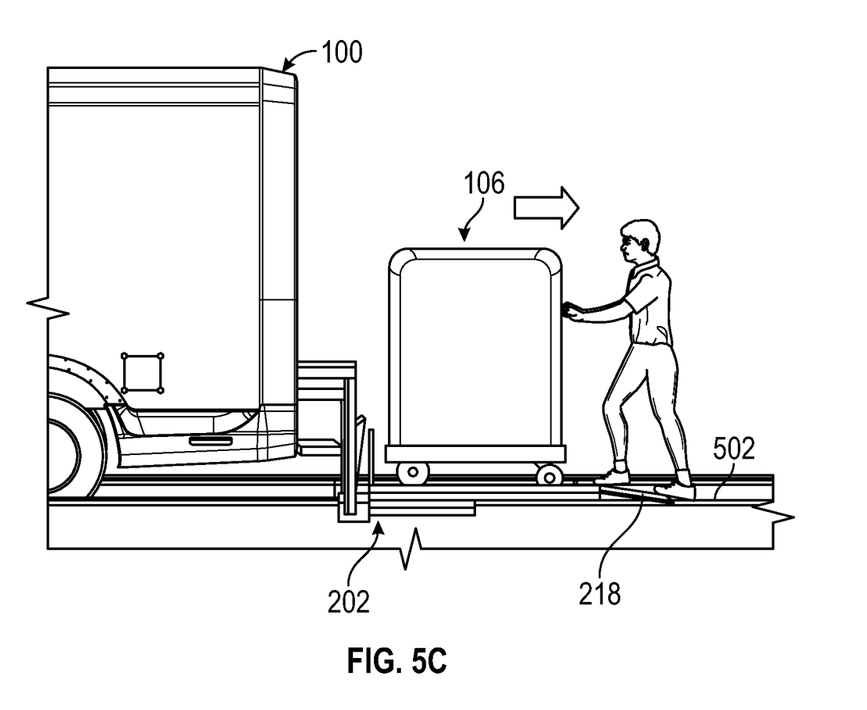

FIGS. 5A-5C illustrate concluding steps of the cargo unloading operation for unloading the package 106 to a street or a delivery platform 502 below the floor 108 of the delivery vehicle 100. The concluding steps of FIGS. 5A-5C are performed after the steps of FIGS. 3A-3J or when the lift is in the configuration shown in FIG. 3J. As shown in FIG. 5A, the lift platform 202 is lowered to the street level. The rear bridge plate 218 and the front bridge plate 214 can be in the 90-degree position as the lift platform 202 is lowered to prevent the package from rolling off at either end. As shown in FIG. 5C, when the lift platform 202 reaches the street, the rear bridge plate 218 is unlocked from the 90-degree position and rotated to the 180-degree position so that an outer edge of the rear bridge plate 218 rests on the street. As shown in FIG. 5C, the package 106 is then rolled off of the lift platform 202 onto the street via the rear bridge plate 218.

Figure 6A:
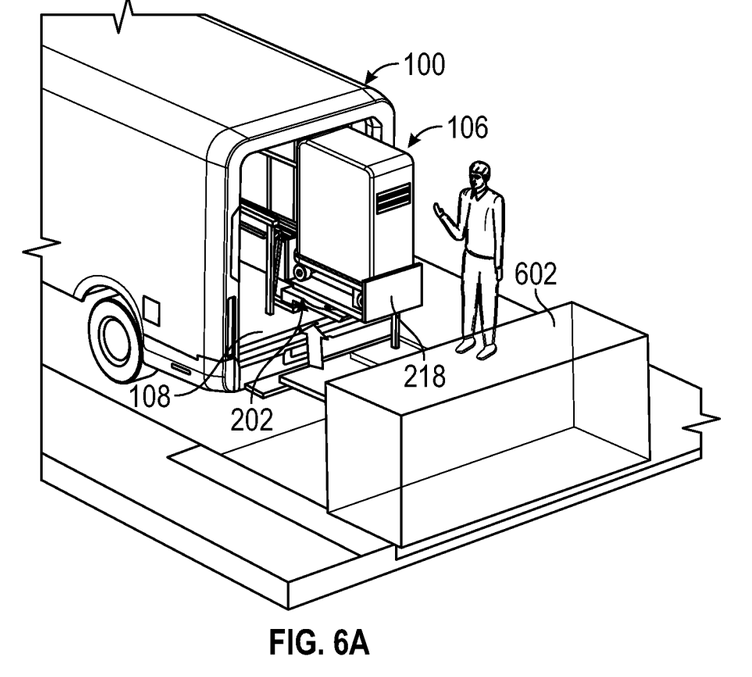
FIGS. 6A-6C illustrate concluding steps of the cargo unloading operation for unloading the package to a delivery platform located vertically above the floor of the delivery vehicle.
Figure 6B:
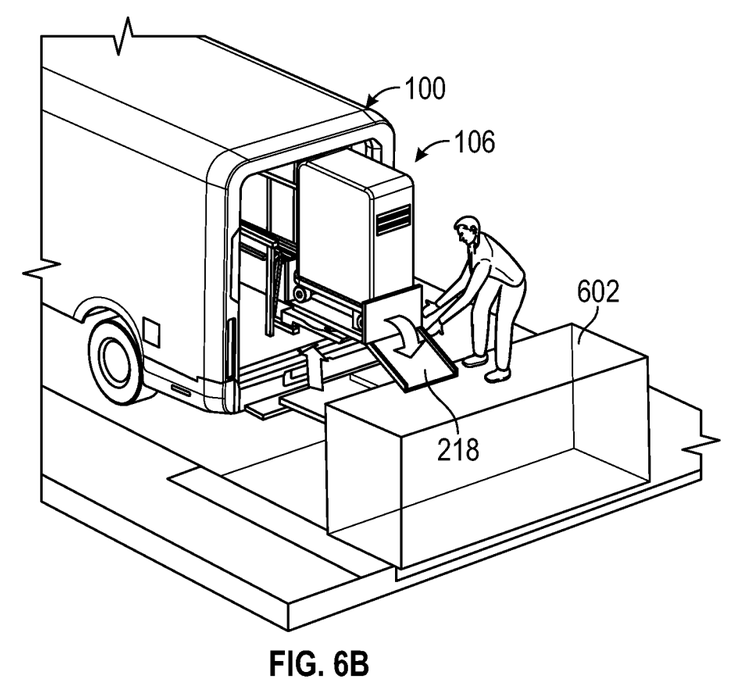
Figure 6C:
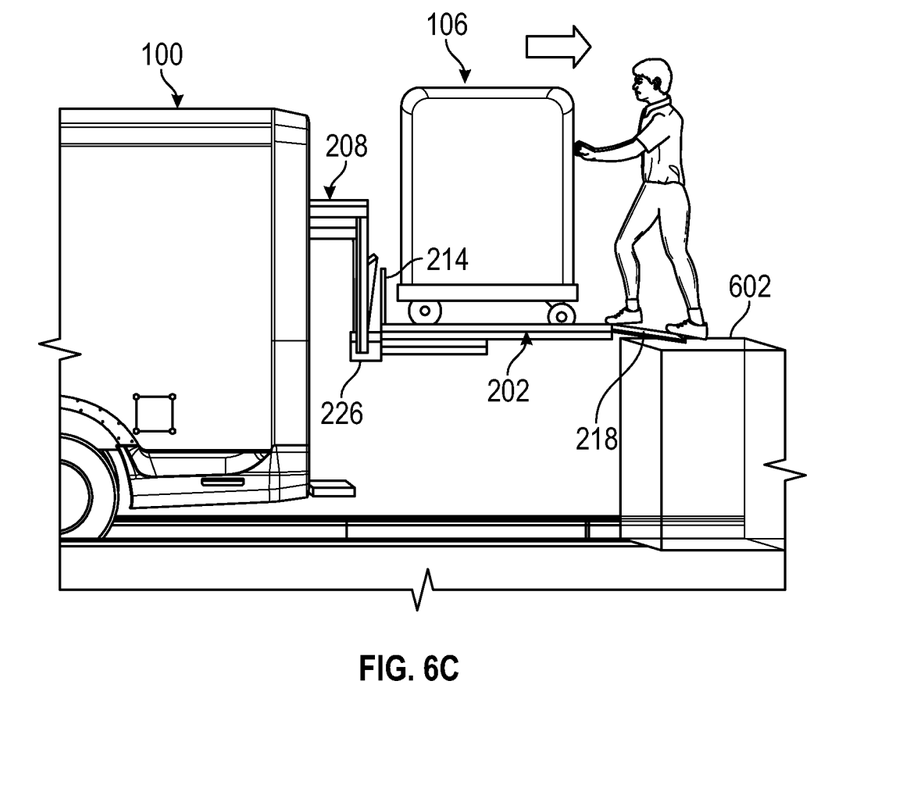

FIGS. 6A-6C illustrate concluding steps of the cargo unloading operation for unloading the package to a delivery platform 602 located vertically above the floor 108 of the delivery vehicle 100. The concluding steps of FIGS. 6A-6C are performed after the steps of FIGS. 3A-3J or when the lift platform 202 is in the configuration shown in FIG. 3J. As shown in FIG. 6A, the lift platform 202 is raised to the level of the delivery platform 602. The rear bridge plate and the front bridge plate 218 can be in the 90-degree position as the platform is raised to prevent the package 106 from rolling off at either end. As shown in FIG. 6B, when the platform reaches the height of the delivery platform 602, the rear bridge plate 218 is unlocked from the 90-degree position and rotated to the 180-degree position so that an outer edge of the rear bridge plate rests on the delivery platform. As shown in FIG. 6C, the package 106 is then rolled off of the lift platform 202 onto the delivery platform 602 via the rear bridge plate 218.

While the invention is disclosed and illustrated herein as being used to unload a package from the delivery vehicle to a delivery platform, it is clear that by reversing the order of the steps shown herein, an operator can load a package from the delivery platform onto the delivery vehicle.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of transferring a package between a vehicle and a delivery platform, comprising:
    folding down a lift platform and a turntable from a retracted position inside the vehicle to an extended position in which the lift platform and the turntable are extended outside of the vehicle via a support structure, wherein a slider rail mechanism is coupled to the support structure and the turntable;
    moving the package to the lift platform from one of a floor of the vehicle and the delivery platform;
    moving the lift platform along a transverse axis of the vehicle via the slider rail mechanism;
    rotating the lift platform through a rotation angle via the turntable; and
    moving the package from the lift platform to the other of the floor and the delivery platform.

2. The method of claim 1, further comprising moving the support structure vertically with respect to the floor of the vehicle.

3. The method of claim 1, further comprising moving the support structure parallel to the floor via a linear actuator to extend the lift platform from the floor.

4. The method of claim 1, wherein the lift platform includes a center section, a front bridge plate hingedly coupled to the center section and a rear bridge plate hingedly coupled to the center section, further comprising rotating at least one of the front bridge plate and the rear bridge plate to a 90-degree position with respect to the center section.

5. The method of claim 4, further comprising rotating the front bridge plate to a 180-degree position with respect to the center section to form a bridge between the floor and the center section.

6. The method of claim 1, wherein the delivery platform is located at one of a left side and a right side of the vehicle.

7. A cargo transfer device for a vehicle, comprising:
    a lift platform;
    a slider rail mechanism configured to move the lift platform along a transverse axis of the vehicle;

a turntable configured to rotate the lift platform through a rotation angle, wherein the turntable is coupled to the slider rail mechanism and the lift platform rests on the turntable; and a support structure configured to support the slider rail mechanism, wherein the lift platform and the turntable are configured to fold down from a retracted position inside the vehicle to an extended position in which the lift platform and the turntable are extended outside of the vehicle.

8. The cargo transfer device of claim 7, further comprising a rail lift for moving the support structure vertically with respect to a floor of the vehicle.

9. The cargo transfer device of claim 7, further comprising a linear actuator for moving the support structure parallel to a floor of the vehicle to extend the lift platform from the floor.

10. The cargo transfer device of claim 7, wherein the lift platform includes a center section, a front bridge plate hingedly coupled to the center section and a rear bridge plate hingedly coupled to the center section, wherein at least one of the front bridge plate and the rear bridge plate are configured to be rotated to a 90-degree position with respect to the center section.

11. The cargo transfer device of claim 10, wherein the front bridge plate is configured to rotate to a 180-degree position to form a bridge between a floor of the vehicle and the center section.

12. The cargo transfer device of claim 7, wherein the turntable rotates the lift platform for unloading of a package to a delivery location at one of a left side and a right side of the vehicle.

13. A vehicle, comprising:
a cargo area; and
a cargo transfer device located within the cargo area, the cargo transfer device including:
a lift platform;
a slider rail mechanism configured to move the lift platform along a transverse axis of the vehicle;
a turntable configured to rotate the lift platform through a rotation angle, wherein the turntable is coupled to the slider rail mechanism and the lift platform rests on the turntable; and
a support structure configured to support the slider rail mechanism, wherein the lift platform and the turntable are configured to fold down from a retracted position inside the vehicle to an extended position in which the lift platform and the turntable are extended outside of the vehicle.

14. The vehicle of claim 13, further comprising a rail lift for moving the support structure vertically with respect to a floor of the vehicle and a linear actuator for moving the support structure parallel to the floor to extend the lift platform from the floor.

15. The vehicle of claim 13, wherein the lift platform includes a center section, a front bridge plate hingedly coupled to the center section and a rear bridge plate hingedly coupled to the center section, wherein at least one of the front bridge plate and the rear bridge plate are configured to rotated to a 90-degree position with respect to the center section.

16. The vehicle of claim 15, wherein the front bridge plate is configured to rotate to a 180-degree position to form a bridge between a floor of the cargo area and the center section.

17. The vehicle of claim 13, wherein the turntable rotates the lift platform for unloading of a package to a delivery platform at one of a left side and a right side of the vehicle.

* * * * *